United States Patent [19]

Suzuki

[11] Patent Number: 5,130,854
[45] Date of Patent: Jul. 14, 1992

[54] SUPPORTING UNIT FOR LENS DRIVE

[75] Inventor: Hiroyuki Suzuki, Higashihiroshima, Japan

[73] Assignee: Sharp Kabushiki Kaisha, Osaka, Japan

[21] Appl. No.: 647,417

[22] Filed: Jan. 29, 1991

[30] Foreign Application Priority Data

Jan. 31, 1990 [JP] Japan .................................. 2-21356

[51] Int. Cl.⁵ .............................................. G02B 7/02
[52] U.S. Cl. ...................................... 359/823; 359/824
[58] Field of Search ............... 359/819, 823, 813, 824; 369/44.15, 44.16

[56] References Cited

U.S. PATENT DOCUMENTS

| | | | |
|---|---|---|---|
| 4,750,164 | 6/1988 | Nose | 369/256 |
| 4,766,583 | 8/1988 | Oinoue et al. | 369/45 |
| 4,767,187 | 8/1988 | Gijzen et al. | 350/247 |
| 4,794,581 | 12/1988 | Andresen | 369/45 |
| 4,817,076 | 3/1989 | Van Sluys et al. | 369/45 |
| 4,818,066 | 4/1989 | Nose | 350/247 |

Primary Examiner—Frank Gonzalez

[57] ABSTRACT

A supporting unit for lens drive for supporting an objective lens movably in vertical and horizontal directions to focus a light beam on an optical recording medium includes: a lens holder for holding the objective lens; a mounting portion for mounting the lens holder; a fixing portion for fixing the supporting unit for lens drive; a pair of coupling members disposed in parallel with each other in the vertical direction between the mounting portion and the fixing portion; a pair of first hinge portions coupling one end of each of the coupling members to the mounting portion; and a pair of second hinge portions coupling the coupling members to the fixing portion to enable the coupling members to move in the vertical direction. The mounting portion can be divided into upper and lower portions so that the lens holder can be held therebetween. According to the present invention, the hinge portions for coupling the mounting portion for mounting the lens holder to the coupling members have flexibilities in the vertical and horizontal directions and, accordingly, the number of hinge portions for moving the supporting unit for lens drive is reduced.

7 Claims, 7 Drawing Sheets

SUPPORTING UNIT FOR LENS DRIVE

BACKGROUND OF THE INVENTION

1. Field of the Invention

The present invention relates to a supporting unit for lens drive to be used in an objective lens driving device or the like of an optical pickup device mounted in an optical disk device.

2. Description of the Background Art

An optical pickup device is mounted in a lens driving device where a light beam is focused on a recording surface of an optical disk by means of an objective lens, which is controlled according to change in a detected quantity of reflected light from the optical disk to accurately trace prescribed tracks successively on the recording surface. The objective lens is driven by the lens driving device in two directions, that is, an optical axis direction, i.e., a focusing direction perpendicular to the recording surface of the optical disk, and a direction orthogonal with the optical axis, i.e., a tracking direction parallel to the recording surface of the optical disk.

Figure 1:
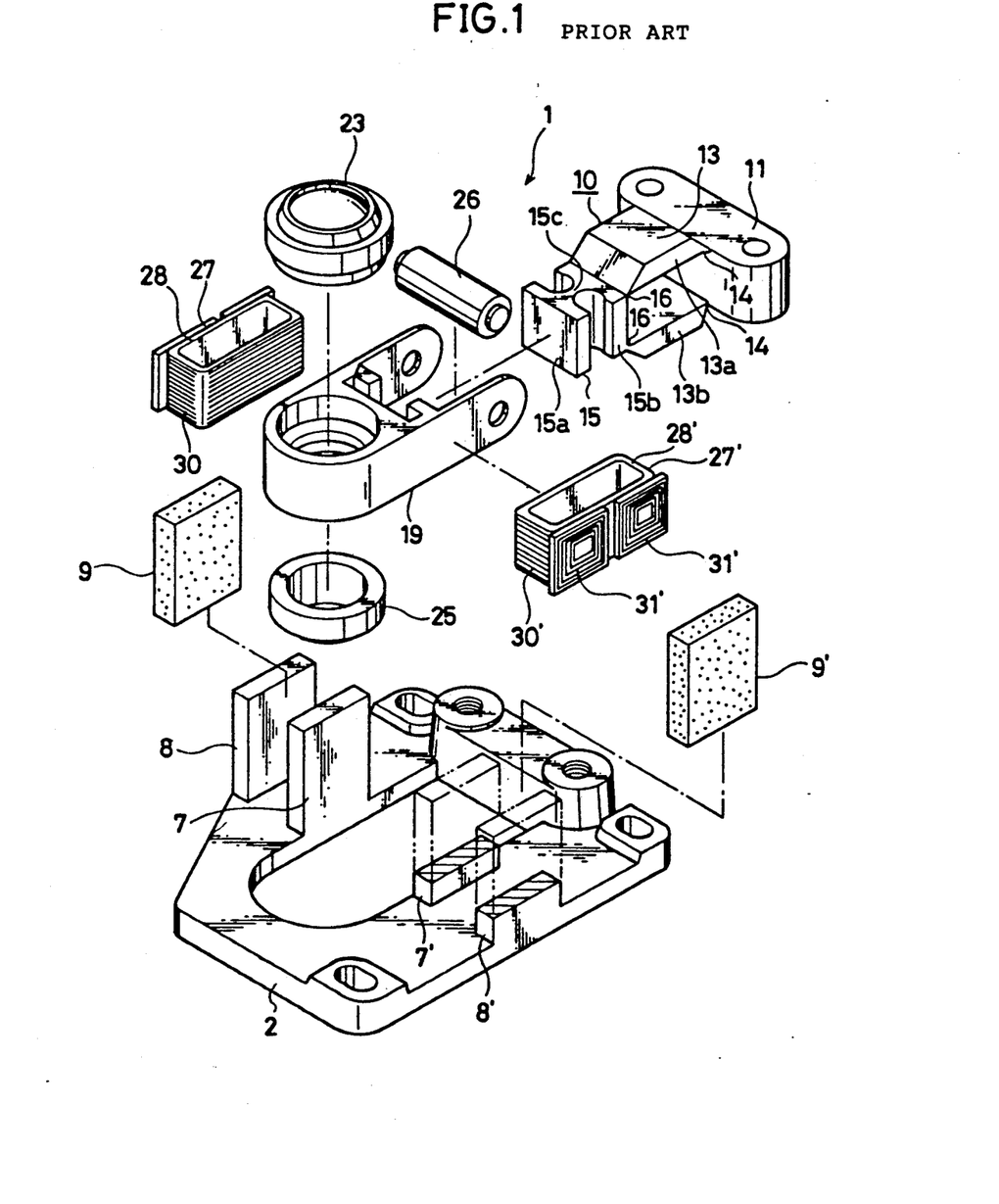
FIG. 1 is an exploded perspective view showing an optical pickup device and a supporting unit for lens drive according to the prior art.

In the above-described case, it is necessary to drive the objective lens accurately along those two directions. U.S. Pat. No. 4,766,583 to Oinoue et al discloses an optical pickup device for driving an objective lens in the above-mentioned two directions. Referring to FIG. 1 of this patent, in this optical pickup device 1, the objective lens 23 is held by a support member 19 supported on a base plate by means of a coupling unit 10. Drive coil assemblies 27 and 27' are attached to the opposite side surfaces of the support member 19. Those drive coil assemblies 27 and 27' include focusing coils 30 and 30', and tracking coils (31) (not shown) and 31, Those drive coil assemblies 27 and 27' are set in a state in which coil bases 28 and 28' are placed around inner yokes 7 and 7' formed on the base plate 2. Magnets 9 and 9' are attached on the surfaces of outer yokes 8 and 8' on the base plate 2 opposite to the inner yokes 7 and 7', corresponding to the tracking coils (31) and 31' of those drive coil assemblies.

In the pickup device 1, the coupling unit 10 permits the objective lens 23 to move in the tracking and focusing directions. The coupling unit 10 is normally formed integrally and it includes a mounting base 11, a parallel link 13 and a hinge member 15. The hinge member 15 has a front hinge member 15a and a rear hinge member 15b opposite to each other and coupled by a flexible thin hinge connection 15c. The hinge connection 15c has a hinge or a rotation axis parallel to the optical axis about which the front hinge member 15a can rotate. The hinge connection 15c allows movement of the front hinge member 15a perpendicular to the optical axis. The parallel link 13 includes upper and lower hinge members 13a and 13b parallel to each other. Each of the hinge members 13a and 13b is of a trapezoid shape. One end of the upper hinge member 13a is coupled to an upper end of the mounting base 11 by means of a flexible thin portion 14, and the other end thereof is coupled to an upper end of the rear hinge member 15b by means of the flexible thin portion 16. One end of the lower hinge member 13b is connected to a lower end of the mounting base 11 by means of the flexible thin portion 14, and the other end thereof is coupled to a lower end of the rear hinge member 15b by means of the flexible thin portion 16. Those flexible thin portions 14 and 16 permit the parallel link 13 to move in the direction parallel to the optical axis. Balancers 26 and 25 are attached to the support member 19 to keep a balance between the weights of the front and rear portions with respect to the hinge shaft of the hinge 15 as a center and to keep a balance between the weights of the upper and lower portions with respect to the above-mentioned hinge shaft.

Focusing and tracking by the optical pickup device 1 thus structured are carried out in the following manner. A light beam applied to the optical disk through the objective lens 23 is reflected on the recording surface of the optical disk. Part of the reflected light beam returns to the optical block through the objective lens 23. The returned light is detected by a photodetector. A control circuit provided in the optical block reads a focusing error signal and a tracking error signal from the photodetector, and supplies correction currents of values according to the error amounts to the focusing coils 30, 30', and the tracking coils (31), 31'. The support member 19 is moved in the focusing direction by magnetic force having intensity set dependent on a relation between the direction of the current flowing in the focusing coils 30, 30, and the direction of a generated magnetic flux. Similarly, the support member 19 is rotated in the tracking direction around the hinge shaft of the hinge 15 by magnetic force the intensity of which is set dependent on a relation between the direction of the current flowing in 'the tracking coils (31), 31' and the direction of the generated magnetic flux. By the above-described operation, focusing and tracking are carried out.

The above-mentioned coupling 10 is normally molded integrally by synthetic resin. In the integral molding, portions of a mold for forming the flexible thin portions 14, 16 and the hinge connection 15c are narrow, which causes obstruction to flow of the resin in the mold. Such narrow portions of the mold make it difficult in a manufacturing process to stably and rapidly manufacture the coupling unit 10, i.e., the supporting unit for lens drive, having a uniform quality by integral molding.

SUMMARY OF THE INVENTION

A main object of the present invention is to provide quality than in the prior art and being able to be rapidly and stably manufactured in an integral molding process using synthetic resin.

Another object of the present invention is to provide a supporting unit for lens drive having a smaller number of necessary components for a lens holder than in the prior art.

A supporting unit for lens drive according to the present invention supports an objective lens movably in vertical and horizontal directions to focus a light beam on an optical disk. The supporting unit for lens drive according to the present invention includes: a lens holder for holding the objective lens; a mounting portion for mounting the lens holder; a fixing portion for fixing the supporting unit for lens drive; a pair of coupling members disposed in the vertical direction, parallel to each other between the mounting portion and the fixing portion; a pair of first hinge portion coupling one end of each coupling member to the mounting portion; and a pair of second hinge portion coupling the other ends of the respective coupling members to the fixing portion. The pair of first hinge portion permits the mounting portion to move in the vertical and horizontal directions. The pair of second hinge portion permits the coupling members to move in the vertical direction.

The mounting portion may be divided into upper and lower two portions. In this case, the lens holder is disposed in a manner held between the upper and lower mounting portions. If the lens holder is to be mounted with a portion of the lens holder being held in those mounting portions to be between the pair of coupling members, the lens holder can be mounted in the mounting portions at the position of the center of gravity of the holder.

The mounting portion, the fixing portion, the coupling members and the first and second hinge portions can be molded integrally by using synthetic resin.

An advantage of the present invention is that compared with the prior art, there are less irregularities in qualities of supporting units for lens drive manufactured by an integral molding process using synthetic resin. In manufacturing of a supporting unit according to the present invention, it is possible to provide a supporting unit of a stable quality even if the integral molding is carried out at a higher speed than in the prior art. According to the present invention, it is possible to reduce the number of hinge portion causing obstruction to flow of the resin. Thus, the flow of the resin in a mold for the integral molding is improved and even if the integral molding is carried out at a high speed, the quality of the manufactured supporting unit for lens drive is stable.

In a conventional supporting unit for lens drive, it is necessary to provide balancers in a lens holder. According to the present invention, a lens holder can be mounted in a mounting portion at the position of the center of gravity thereof and thus it is not necessary to provide balancers. Consequently, the number of steps for assembling the supporting unit can be decreased. Thus, it is possible to reduce manufacturing costs compared with the prior art.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A preferred embodiment of a supporting unit for lens drive according to the present invention will be described with reference to the drawings.

Figure 2:
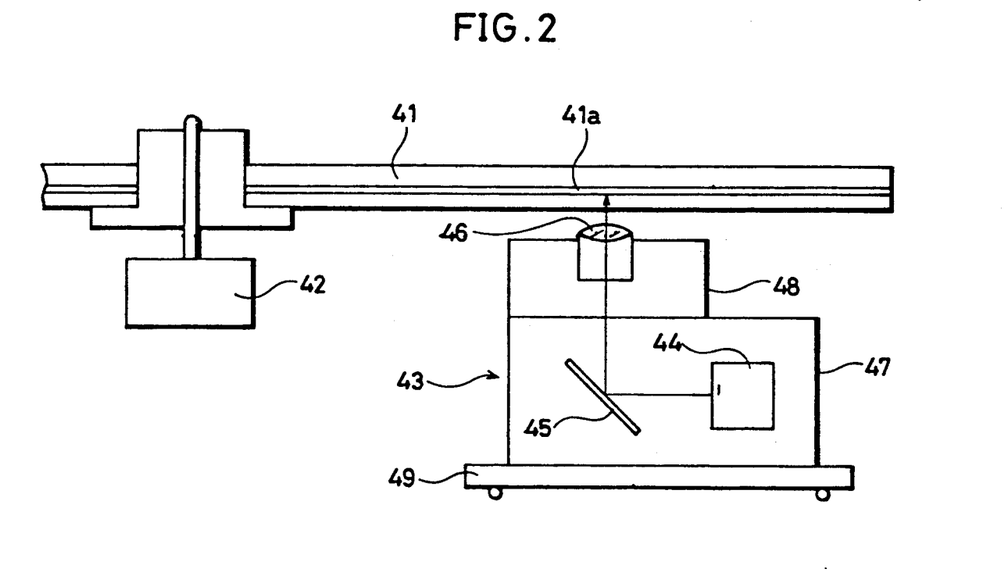
FIG. 2 is a schematic view of an optical disk device comprising an objective lens drive device.

Referring first to FIG. 2, an optical disk device where a specific example of the present invention is incorporated will be described.

The optical disk device includes a motor 42 for rotating an optical disk 41, and an optical pickup device 43 applying a laser beam to the optical disk 41 and receiving reflected light from the optical disk 41. The optical pickup device 43 includes a laser light source 44, a polarization mirror 45, and an objective lens 46. The laser light source 44 and the polarization mirror 45 are disposed in a housing 47, and the objective lens 46 is held by an objective lens drive device 48 to be described afterwards, over the polarization mirror 45. The optical pickup device 43 is movable in a direction parallel to the recording surface of the optical disk 41, that is, in the tracking direction, by means of a carrying mechanism 49 including drive means such as a linear motor.

Figure 3:
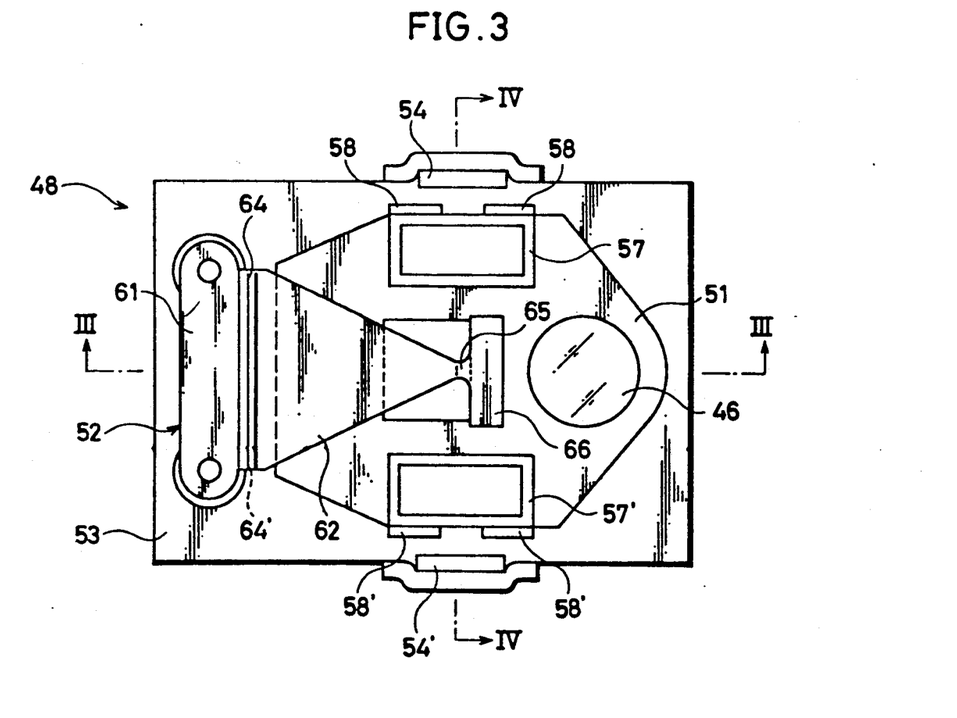
FIG. 3 is a plan view showing an objective lens drive device where a specific example of a supporting unit for objective lens drive according to the present invention is mounted.

Next, the structure of the objective lens drive device 48 will be described with reference to FIG. 3. Referring to FIG. 3, the objective lens 46 is placed in a through hole formed in an end portion (the right end in the figure) of the lens holder 51 on a flat plate and the lens holder is supported substantially in parallel with a base plate 53 on the flat plate in a supporting unit 52 for lens drive.

Magnetic circuits including magnets 54 and 54' are provided on both side end portions (the upper and lower end portions in the figure) of the base plate 53. A pair of focusing coils 57 and 57', and a pair of tracking coils 58 and 58, are provided on the opposite side end portions of the magnets 54 and 54', respectively. When the focusing coils 57 and 57' are conducted, electromagnetic force is generated to move the lens holder 51 in the direction perpendicular to the paper surface of the figure, that is, in the focusing direction parallel to the optical axis of the objective lens 46. On the other hand, when the tracking coils 58 and 58' are conducted, electromagnetic force in a direction of rotation of the lens holder 51 is generated while the lens holder 51 is maintained horizontal. The lens holder 51 is supported in the supporting unit 52 for lens drive so that the lens holder 51 can move corresponding to the above-mentioned respective electromagnet forces.

Next, the supporting unit 52 for lens drive will be described with reference to FIG. 4.

The supporting unit 52 for lens drive is formed by integral molding using a synthetic resin material. This supporting unit 52 has a fixing portion 61 fixed substantially vertically on the base plate 53. A pair of coupling plates 62 and 63 are formed in parallel with the base plate 53, on upper and lower ends of the fixing portion 61. Those coupling plates 62 and 63 each have an almost triangular form and they are coupled to the fixing portion 61 by means of hinge portions 64 and 64' formed on the upper and lower ends of the fixing portion 61. Each of those hinge portions 64 and 64' has a vertically curved form and includes a partially thin portion. Thus, those hinge portions have flexibility permitting the coupling plates 62 and 63 to move in the vertical direction.

Each of the coupling plates 62 and 63 has the triangular form. Quadrangular lens holder mounting portions 66 and 66' extending horizontally are coupled to top portions of the those coupling plates 62 and 63 corresponding to vertexes of the triangular forms. The hinge portions 65 and 65' have portions narrowed in the horizontal direction and those hinge portions have flexibility permitting the respective lens holder mounting portions 66 and 66' to move horizontally along the horizontal plane. In addition, those hinge portions 65 and 65' are provided with grooves locally thin in the vertical direction as shown in FIG. 5 for example, whereby the lens holder mounting portions have flexibility permitting those mounting portions to move in the direction along a plane relatively vertically to the coupling plates 62 and 63. The vertically opposite surfaces of the lens holder mounting portions 66 and 66' have pin portions 67 and 67' to be inserted in pin holes formed in the lens holder 51, for mounting the lens holder 51.

After main portions of the supporting unit 52 for lens drive having the above-described structure are mounted on the base plate 53, the lens holder 51 is inserted between the lens holder mounting portions 66 and 66' as shown in FIGS. 3 and 5 and the pin portions 67 and 67' of the lens holder mounting portions 66 and 66' are inserted into the pin holes of the lens holder 51, whereby the lens holder 51 is fixed to the mounting portions. The lens holder 51 is formed so that its center of gravity is substantially coincident with the center of balance of rotation moment. The lens holder 51 is mounted so that the hinge portions 65 and 65' are located at the center of gravity.

Next, operation for reading information from the optical disk 41 in the optical disk device thus structured will be described. Referring to FIG. 2, in the optical disk device, a laser beam emitted from the laser light source 44 is polarized by means of the polarization mirror 45 and then the beam is focused on a recording layer 41a of the optical disk 41. Then, reflected light dependent on presence or absence of pits in the recording layer 41a is detected, whereby information recorded in the recording layer 41a is read. At the time of applying the laser beam to the optical disk 41, first, the optical pickup device 43 is moved in parallel with the recording surface of the optical disk 41 by carrying operation of the carrying mechanism 49 so as to access rapidly a target track. After the accessing by the optical pickup device 43, a signal for driving the objective lens drive device 48 is generated dependent on change in a detected amount of the reflected light from the recording layer 41a. Referring to FIGS. 3 to 5, if the focus position of the laser beam does not exist on the recording layer 41a, the focusing coil 57 is conducted and electromagnetic force is generated to move the lens holder 51 in the focusing direction. As a result, as shown in FIG. 5, the lens holder 51 held between the lens holder mounting portions 66 and 66' is moved vertically by operation of a parallel link mechanism maintaining the pair of coupling members 62 and 63 in parallel in the supporting unit for lens drive. This movement depends on the vertical flexibilities of the hinge portions 64, 64' and the hinge portions 65, 65'. In consequence, the objective lens 46 is driven in the vertical direction, that is, in the focusing direction with its optical axis being not inclined. Thus, correction is made so that the focus is on the recording layer 41a of the optical disk 41.

If it is detected that the position where the laser beam is applied deviates horizontally from a prescribed track in the recording layer 41a, the tracking coils 58 and 58, are conducted, whereby electromagnetic force is generated to rotate the lens holder 51 in the horizontal plane. Since the hinge portions 65 and 65' have also a flexibility permitting those portions to move in the direction along the horizontal surface with respect to the lens holder mounting portions 66 and 66', the lens holder mounting portions 66 and 66' supporting the lens holder 51 are rotated on those hinge portions as support points. As a result, the objective lens 46 moves in the tracking direction, whereby the laser beam is applied to the prescribed position on the track.

Thus, the drive of the objective lens 46 in the focusing direction and/or the tracking direction is controlled, so as to maintain a state in which the focus of the laser beam traces accurately a prescribed track.

Consequently, information is accurately read from the recording layer 41a of the optical disk 41.

As described above, in the supporting unit 52 for lens drive according to the embodiment, the hinge portions 65 and 65' have functions as hinges in both the focusing and tracking directions. The lens holder mounting portions 66 and 66' are supported so as to be in parallel link operation in the focusing direction and horizontal operation in the tracking direction in the same manner as in the prior art.

As described above, the hinge portions 65 and 65' have both functions as focusing hinges and tracking hinges in the prior art. For this reason, the supporting unit for lens drive according to the present invention has a smaller number of hinge portions and a simpler structure of the hinge portions compared with the prior art. If the supporting unit 52 for lens drive is integrally molded by using synthetic resin, a mold for the molding has a smaller number of portions especially narrowing flow of the resin corresponding to the hinge portions, and the resin flows more smoothly particularly in the portions forming the tracking hinges in the mold, compared with the prior art. Thus, the flow of the resin in the mold is generally improved and it is possible to manufacture a supporting unit of a more uniform quality at a higher speed.

Figure 4:
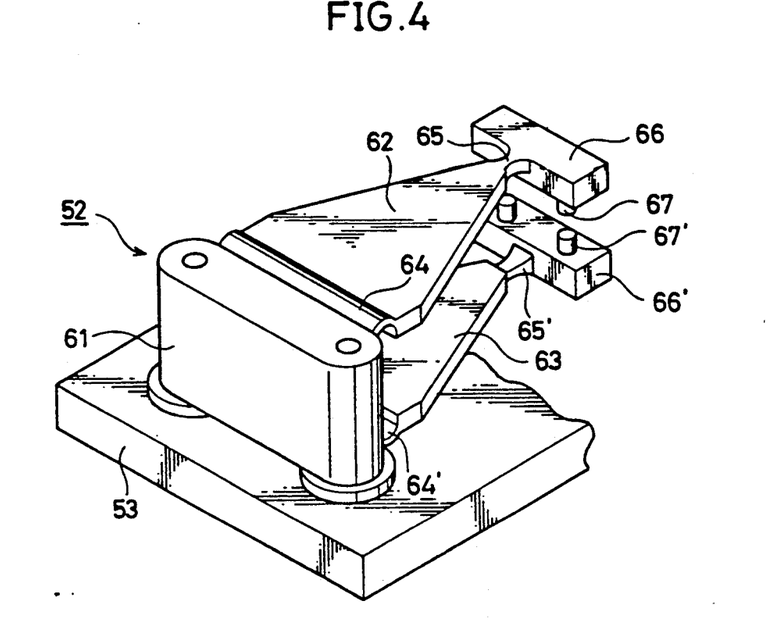
FIG. 4 is a perspective view showing a specific example of a supporting unit for lens drive according to the present invention.
Figure 5:
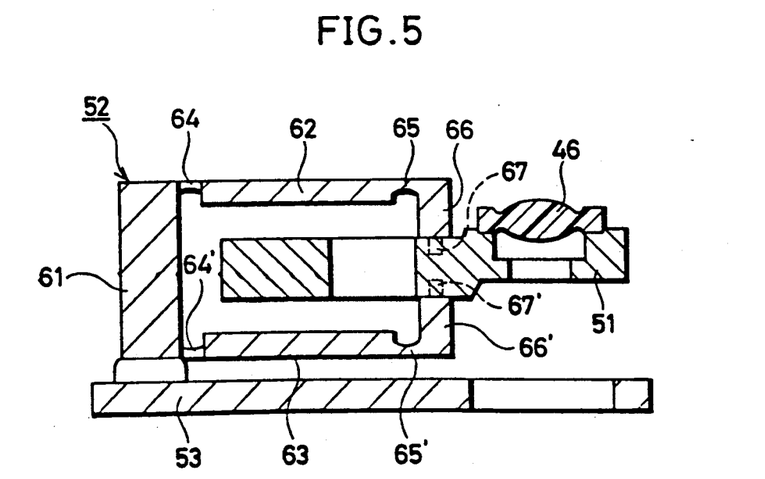
FIG. 5 is a sectional view taken along the line III—III in FIG. 3.
Figure 6:
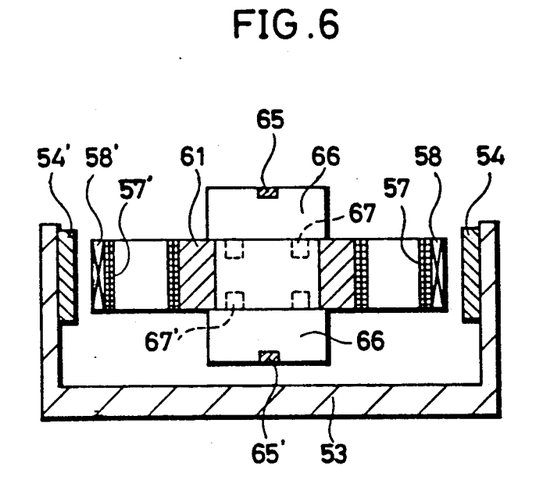
FIG. 6 is a sectional view taken along the line IV—IV in FIG. 3.

As shown in FIG. 4, the lens holder mounting portions have the structure divided into the upper and lower portions. Consequently, at the time of mounting the lens holder 51, the lens holder 51 is placed between the lens holder mounting portions 66 and 66' and then it can be set between the lens holder mounting portions at the position of its center of gravity. As described above, the lens holder 51 is formed so that its center of gravity substantially coincides with the center of the rotation moment. Consequently, the lens holder 51 itself balances with the mounted portions being used as the center. This makes it unnecessary to provide the lens holder with such balancers as required in the conventional supporting unit.

Thus, since the number of components is reduced, the number of assembling steps for example is reduced, making it possible to lower the manufacturing cost, and it is possible to further reduce the size of the supporting unit.

Figure 7:
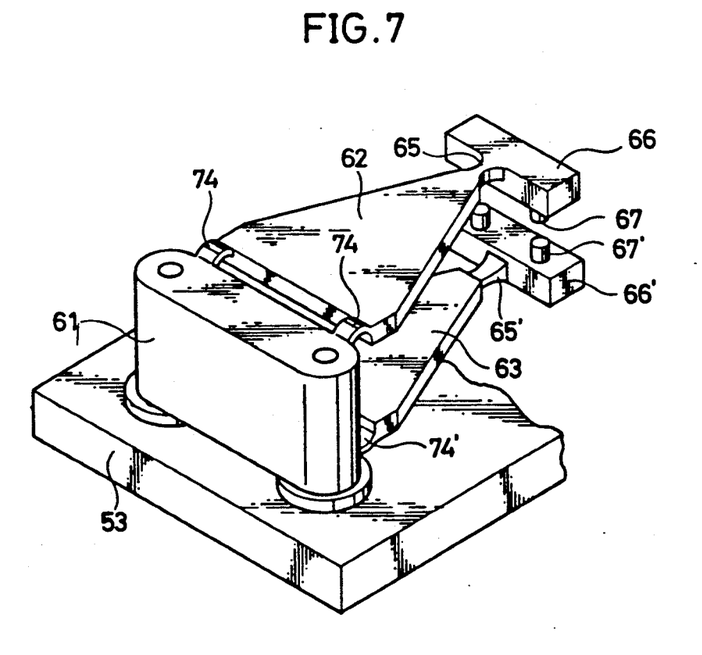
FIG. 7 is a perspective view showing another specific example of a supporting unit for lens drive according to the present invention.

The fixing portion 61 and the coupling member 62 can be coupled by means of a pair of hinge portions 74, 74 provided separately in the horizontal direction on both end portions of the fixing portion 61, as shown in FIG. 7. In this case, the coupling member 63 is coupled to the fixing portion 61 by means of a pair of hinge portions 74', (74') (the one on the opposite side is not shown) provided separately in the horizontal direction on the lower end portions of the fixing portion 61. Thus, by coupling the fixing portion 61 to the coupling members 62, 63 using the four small hinge portions 74, 74, 74', 74', those hinge portions can be made to have less rigidity compared with the rigidity of the hinge portions 64 and 64' of the above-mentioned embodiment. By the adjustment of the rigidity, the vertical flexibility of those hinge portions is further enhanced. Consequently, the supporting unit can move more smoothly in the vertical direction.

Figure 8:
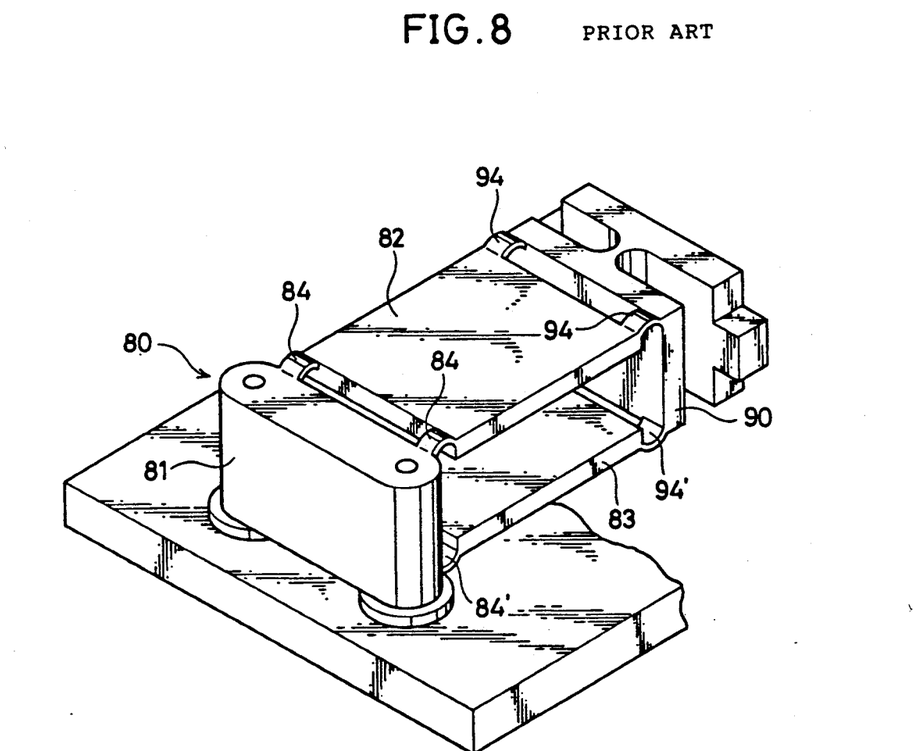
FIG. 8 is a perspective view showing still another specific example of a supporting unit for lens drive according to the prior art, in which the rigidity of hinge portions having vertical flexibility is adjusted.
Figure 9A:
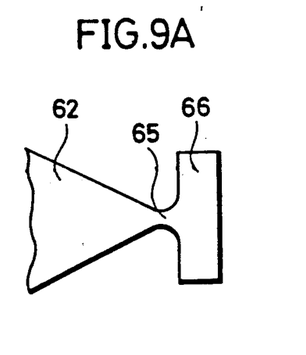
FIGS. 9A to 9D are plan views showing various examples of shapes of tracking hinge portions allowing the hinge portions to have horizontal flexibility in a supporting unit for lens drive according to the present invention.
Figure 9B:
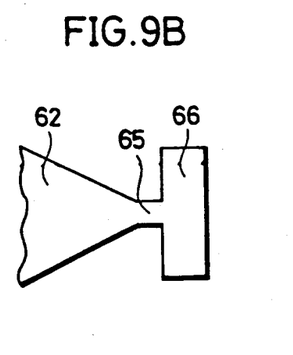
Figure 9C:
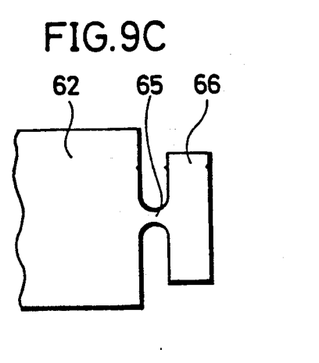
Figure 9D:
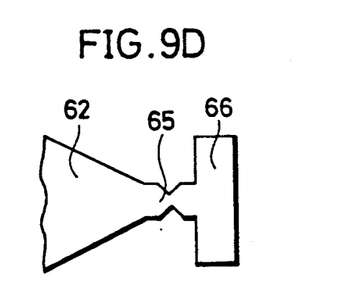

Let us assume a case in which such adjustment of rigidity is made in a conventional objective lens supporting unit. In a lens supporting unit 80 shown in FIG. 8, such rigidity adjustment could be made. Referring to FIG. 8, an end of an upper coupling member 82 is coupled to a fixing portion 81 by means of a pair of hinge portions 84, 84 provided separately positions in the horizontal direction on upper end portions of the fixing portion 81. The other end of the upper coupling portion 82 is coupled to an upper end of a hinge member 90 by means of a pair of hinge portions 94, 94 provided separately in the horizontal direction. Similarly, one end of a lower coupling member 83 is coupled to a lower end of the fixing portion 81 by means of a pair of hinge portions 84', (84') (the one on the opposite side is not shown), and the other end thereof is coupled to a lower end of the hinge member 90 by means of a pair coupling members 94', (94') (the one on the opposite side is not shown). Those eight hinge portions have vertical flexibility. Thus, rigidity is adjusted by such structure of the hinge portions having the vertical flexibility in the conventional objective lens supporting unit. However, in the case where each of the coupling members 82 and 83 is coupled at the four positions as mentioned above, if expansion or deformation occurs due to change in temperature for example, one of the four coupling points is liable to be displaced from the surface including the other three points. Thus, the coupling members of the conventional unit are liable to be distorted and deformed. Such deformation would cause the objective lens to be inclined or the position of the lens to deviate from the correct position. In consequence, unfavorable effect would be exerted on tracking and focusing.

By contrast, according to the present invention, each of the coupling plates 62 and 63 provided between the fixing portion 61 and the lens holder mounting portions 66 and 66' is coupled by the three hinge portions, that is, the two hinge portions on the fixing portion and the one hinge portion on the mounting portion, as shown in FIG. 7. This coupling structure causes less distortion as mentioned above compared with the conventional device having four hinge portions. Consequently, the lens holder 51 set between the lens holder mounting portions 66 and 66, can be prevented from inclining or being dislocated.

Figure 10A:
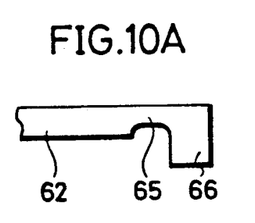
FIGS. 10A to 10F are side views showing various shapes of tracking portions enabling the hinge members to have vertical flexibility in a supporting unit for lens drive according to the present invention.
Figure 10B:
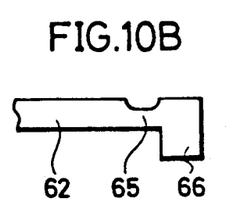
Figure 10C:
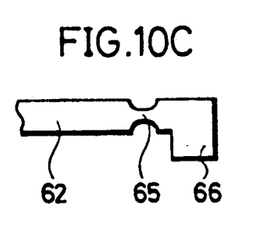
Figure 10D:
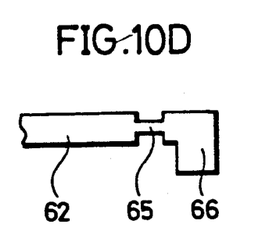
Figure 10E:
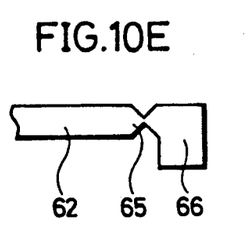
Figure 10F:
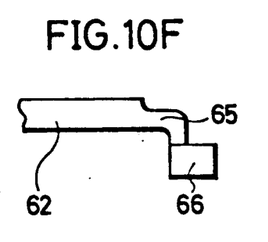
Figure 11A:
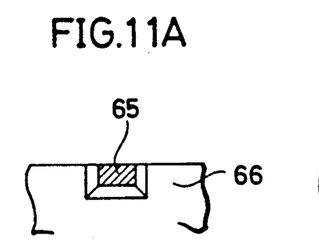
FIGS. 11A to 11E represent sectional views showing various sectional shapes of tracking hinge portions according to the present invention.
Figures 11B, 11C:
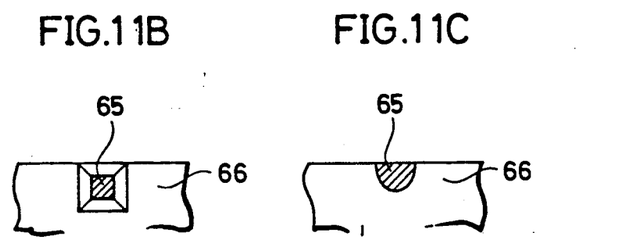
Figure 11D:
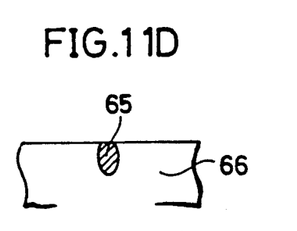
Figure 11E:
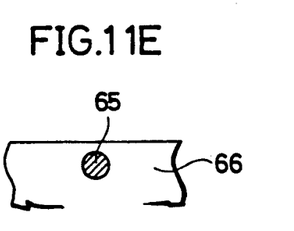

The hinge portion 65 on the mounting portion has a form locally narrowed in the horizontal direction as shown in FIGS. 9A to 9D for example, whereby it has flexibility in the tracking direction. At the same time, as shown in FIGS. 10A to 10E for example, the hinge portion 65 has a form locally narrowed in the vertical direction or as shown in FIG. 10F the hinge portion 65 has a curved portion, whereby it has also flexibility in the focusing direction. Furthermore, FIGS. 11A to 11E show various examples of sectional forms of the hinge portion 65. Thus, it is possible to form a hinge portion having flexibilities in the focusing and tracking directions by using forms adopted by arbitrarily combining such examples of plane forms, lateral forms and sectional forms or other forms.

Figure 12:
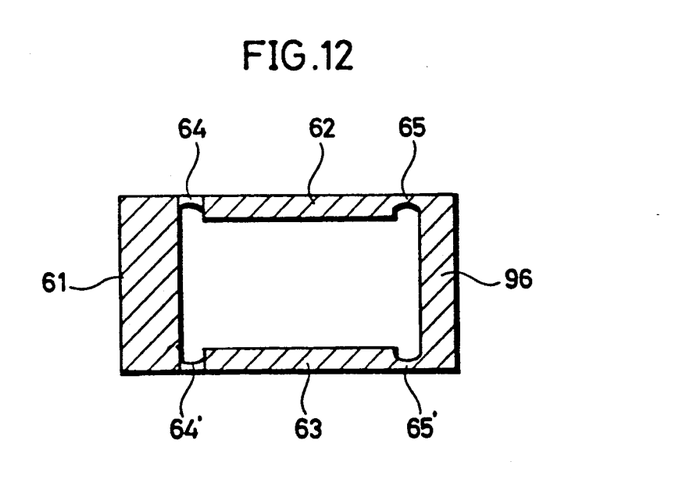
FIG. 12 is a sectional view showing another specific example of a supporting unit for lens drive according to the present invention.

As shown in FIG. 12, it is possible in the scope of the present invention to form a supporting unit for lens drive without dividing the lens mounting portion 96. In this case, a balancer to be inserted between the coupling plates 62 and 63 for keeping balance of the lens holder will be further provided in the position of mounting of the lens holder. Although the supporting unit for lens drive incorporated in the optical pickup device in the optical disk device has been described in the above-described embodiment, the present invention is not limited to the above-described embodiment. For example, according to the present invention, it is possible to form a supporting unit for lens drive to be used in other device having a structure supporting the lens by enabling the lens to be driven in directions substantially perpendicular to each other.

As described in the foregoing, the supporting unit for lens drive according to the present invention has a smaller number of portions causing obstruction to flow of resin corresponding to the hinge portions in a mold for integral molding. Thus, the flow of the resin in the manufacturing process is improved and it is possible to manufacture supporting units of a more uniform quality at a higher speed. In addition, according to one embodiment of the invention, it is not necessary to provide a balancer for keeping balance on a support point of each hinge portion for tracking and thus it is possible to reduce the number of components and the number of assembling steps. Consequently, the supporting unit for lens drive can be manufactured at a reduced cost than in the prior art. In addition, as described above, in the case of adjusting rigidity of the hinge portions having vertical flexibility, the coupling plates coupled by the three hinge portions according to the present invention are unlikely to be deformed due to distortion. Consequently, it is possible to prevent the lens holder mounted in the lens mounting portions from being inclined or being displaced. Thus, the lens holder can be stably held.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A supporting unit for lens drive for supporting an objective lens movably in vertical and horizontal directions to focus a light beam on an optical recording medium, comprising:

a lens holder for holding said objective lens,
a mounting portion for mounting said lens holder, a fixing portion for fixing said supporting unit for lens drive, a pair of coupling members disposed in parallel with each other in the vertical direction between said mounting portion and said fixing portion, and a pair of first hinge portions coupling one end of each of said coupling members to said mounting portion to enable said mounting portion to move in said vertical and horizontal directions, and a pair of second hinge portions coupling said coupling members to said fixing portion to enable said coupling members to move in said vertical direction.

2. The supporting unit for lens drive in accordance with claim 1, wherein said mounting portion is divided into upper and lower portions to hold said lens holder therebetween.

3. The supporting unit for lens drive in accordance with claim 1, wherein said mounting portion, said fixing portion, said coupling members, said first hinge portions, and said second hinge portions are integrally molded by synthetic resin.

4. The supporting unit for lens drive in accordance with claim 2, wherein said lens holder is mounted in said mounting portion in a position corresponding to the center of gravity of said lens holder.

5. The supporting unit for lens drive in accordance with claim 1, wherein each said coupling member has a triangular form, and one of the first hinge portions and two of the second hinge portions are provided at respective vertexes of said triangular form.

6. The supporting unit for lens drive in accordance with claim 2, wherein projecting portions formed in said upper and lower mounting portions are fitted in depressed portions formed in said lens holder, whereby said lens holder is mounted in said mounting portion.

7. The supporting unit for lens drive in accordance with claim 1, wherein each said first hinge portion partially has a form narrowed in said vertical and horizontal direction.

* * * * *